US011849396B2

(12) United States Patent
Ryu et al.

(10) Patent No.: US 11,849,396 B2
(45) Date of Patent: Dec. 19, 2023

(54) DISCONTINUOUS RECEPTION (DRX) WITH SIDELINK (SL)

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Jing Sun, San Diego, CA (US); Ozcan Ozturk, San Diego, CA (US); Peter Gaal, San Diego, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/448,665

(22) Filed: Sep. 23, 2021

(65) Prior Publication Data
US 2022/0095229 A1    Mar. 24, 2022

Related U.S. Application Data

(60) Provisional application No. 63/083,053, filed on Sep. 24, 2020, provisional application No. 63/083,056, filed on Sep. 24, 2020.

(51) Int. Cl.
*H04W 52/02* (2009.01)
*H04W 72/20* (2023.01)
(Continued)

(52) U.S. Cl.
CPC ....... *H04W 52/0232* (2013.01); *H04W 72/20* (2023.01); *H04W 72/23* (2023.01); *H04W 92/18* (2013.01)

(58) Field of Classification Search
CPC ......... H04W 52/0216; H04W 52/0254; H04W 76/14; H04W 52/028; H04W 76/28;
(Continued)

(56) References Cited

U.S. PATENT DOCUMENTS 10,548,181 B2 * 1/2020 Siomina ................ H04W 76/28
11,358,613 B2 * 6/2022 Hur ........................ H04N 7/188
(Continued)

FOREIGN PATENT DOCUMENTS

CN         111699723 A     9/2020
KR      20210098814 A     8/2021
(Continued)

OTHER PUBLICATIONS

International Search Report and Written Opinion—PCT/US2021/071592—ISA/EPO—dated Dec. 13, 2021 (208632WO).
(Continued)

*Primary Examiner* — Jung Liu
(74) *Attorney, Agent, or Firm* — Norton Rose Fulbright US LLP

(57) ABSTRACT

Systems and method for configuring and providing discontinuous reception (DRX) operations in sidelink (SL) mode 1 and mode 2 are disclosed. A first user equipment (UE) may operate in DRX communications with a second UE over a SL while concurrently maintaining DRX communications with a base station. In some embodiments, DRX operations may include the first UE monitoring for either one or both of transmissions in a downlink from a base station and in the SL from the second UE during an active period of a DRX cycle of the DRX configuration. In embodiments, the UE may extend the active period associated with the DRX cycle when control information from either the base station or the second UE is received. Other aspects and features are also claimed and described.

28 Claims, 11 Drawing Sheets

(51) Int. Cl.
*H04W 72/23* (2023.01)
*H04W 92/18* (2009.01)

(58) Field of Classification Search
CPC . H04W 88/04; H04W 92/18; H04W 52/0274; H04W 72/23; H04W 52/0235; H04W 52/0229; Y02D 30/70; H04L 5/0053; H04L 5/001; H04L 5/0048
See application file for complete search history.

(56) References Cited

U.S. PATENT DOCUMENTS

| | | | |
|---|---|---|---|
| 11,503,547 B2* | 11/2022 | Seo | H04W 52/0216 |
| 11,595,980 B2* | 2/2023 | Seo | H04W 52/0216 |
| 2021/0267009 A1* | 8/2021 | Van Phan | H04W 52/0216 |
| 2022/0295405 A1* | 9/2022 | Seo | H04W 52/0235 |
| 2022/0330378 A1* | 10/2022 | Seo | H04W 72/23 |
| 2023/0051303 A1* | 2/2023 | Seo | H04W 52/0274 |
| 2023/0062341 A1* | 3/2023 | Zhou | H04W 76/28 |
| 2023/0063472 A1* | 3/2023 | Freda | H04W 76/28 |
| 2023/0115633 A1* | 4/2023 | Park | H04W 52/0225 370/311 |

FOREIGN PATENT DOCUMENTS

| | | |
|---|---|---|
| WO | WO-2017078783 A1 | 5/2017 |
| WO | WO-2020140815 A1 | 7/2020 |
| WO | WO-2020167773 A1 | 8/2020 |

OTHER PUBLICATIONS

OPPO: "Discussion on DRX Configuration and DRX Timers", 3GPP Draft, R2-2104835, 3rd Generation Partnership Project (3GPP), Mobile Competence Centre, 650, Route Des Lucioles, F-06921 Sophia-Antipolis Cedex, France, vol. RAN WG2, No. E-meeting, May 1, 2021, May 11, 2021 (May 11, 2021), XP052006585, 17 Pages, Retrieved from the Internet: URL: https://ftp.3gpp.org/tsg_ran/WG2_RL2/TSGR2_114-e/Docs/R2-2104835.zip. R2-2154835. Discussion on DRX Configuration and DRX Timers v3.docx. [Retrieved on May 11, 2021], Sections 1-5.

* cited by examiner

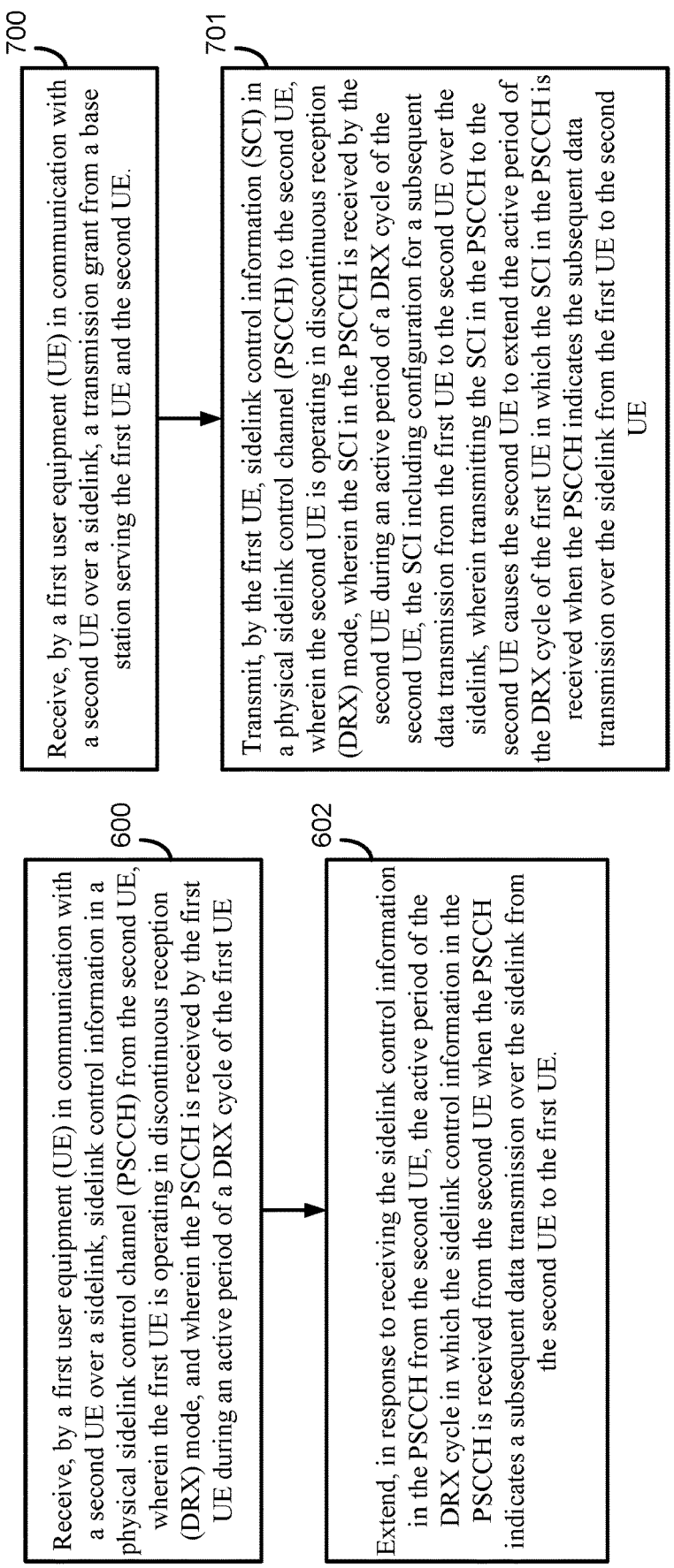

800

Transmit, by a base station serving a first user equipment (UE) and a second UE, a transmission grant to the first UE, the first UE in communication with the second UE over a sidelink, the second UE operating in discontinuous reception (DRX) mode, wherein the transmission grant causes the first UE to send sidelink control information (SCI) in a physical sidelink control channel (PSCCH) to the second UE, the SCI including configuration for a subsequent data transmission from the first UE to the second UE over the sidelink, wherein the SCI in the PSCCH is received by the second UE during an active period of a DRX cycle of the second UE, and wherein receiving the SCI in the PSCCH from the first UE causes the second UE to extend the active period of the DRX cycle of the second UE in which the SCI in the PSCCH is received when the PSCCH indicates the subsequent data transmission over the sidelink from the first UE to the second UE

*FIG. 8*

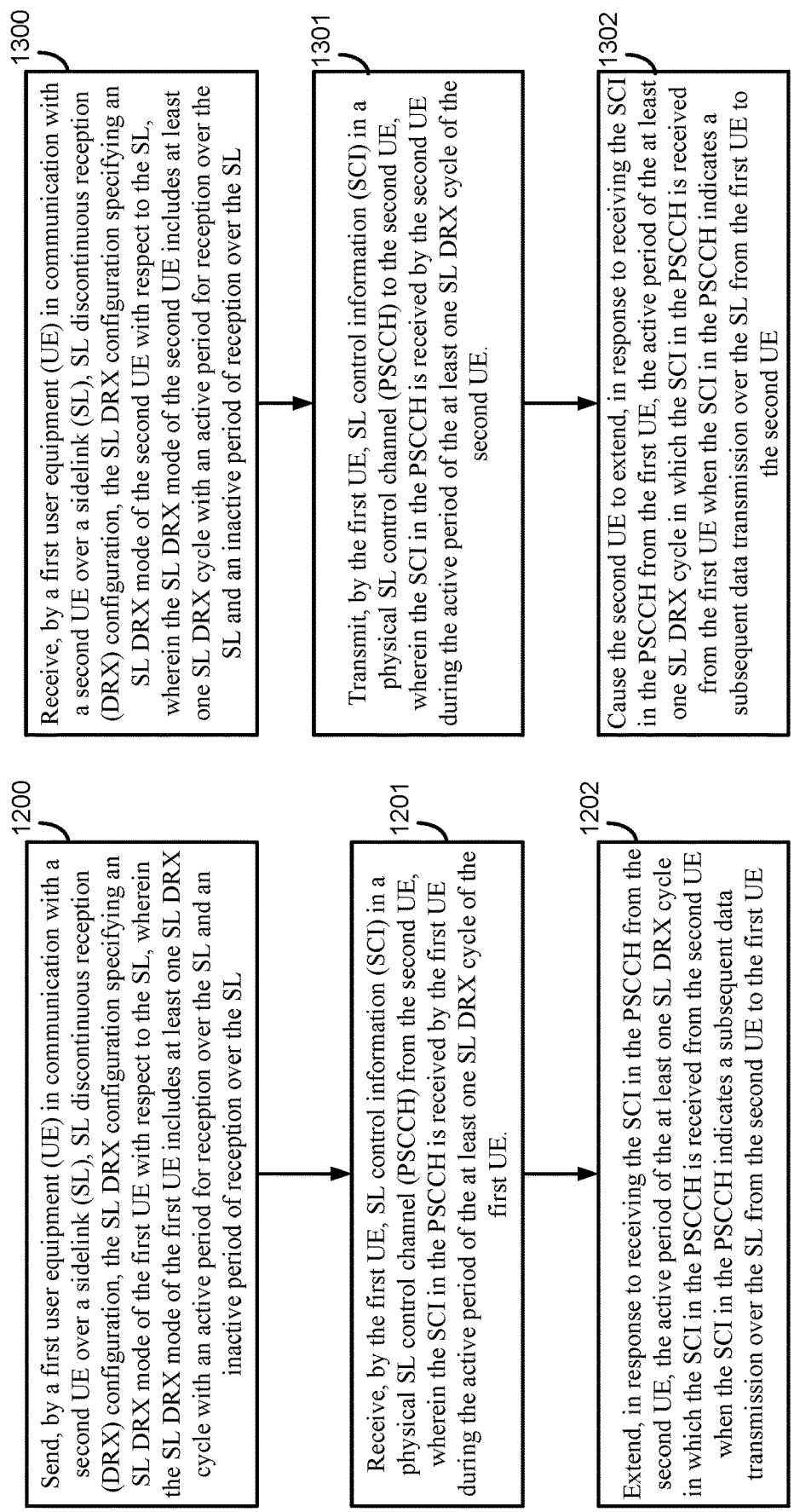

DISCONTINUOUS RECEPTION (DRX) WITH SIDELINK (SL)

CROSS-REFERENCE TO RELATED APPLICATIONS

This application claims the benefit of U.S. Provisional Patent Application No. 63/083,053, entitled, "DISCONTINUOUS RECEPTION (DRX) WITH SIDELINK (SL) IN MODE 1," filed on Sep. 24, 2020, (208632P1), and U.S. Provisional Patent Application No. 63/083,056, entitled, "DISCONTINUOUS RECEPTION (DRX) WITH SIDELINK (SL) IN MODE 2," filed on Sep. 24, 2020, (208633P1), the disclosure of which are hereby incorporated by reference herein in their entirety as if fully set forth below and for all applicable purposes.

TECHNICAL FIELD

Aspects of the present disclosure relate generally to wireless communication systems, and more particularly, to discontinuous reception (DRX) communications. Certain embodiments of the technology discussed below may enable and provide sidelink (SL) DRX communications in SL mode 1 and/or mode 2.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a first UE in communication with a second UE over an SL, SL control information (SCI) in a physical SL control channel (PSCCH) from the second UE. In aspects, the first UE is operating in DRX mode, and the PSCCH is received by the first UE during an active period of a DRX cycle of the first UE. The method also includes extending, in response to receiving the SL control information in the PSCCH from the second UE, the active period of the DRX cycle in which the SL control information in the PSCCH is received from the second UE when the PSCCH indicates a subsequent data transmission over the SL from the second UE to the first UE.

In an additional aspect of the disclosure, a method of wireless communication includes receiving, by a first UE in communication with a second UE over an SL, a transmission grant from a base station serving the first UE and the second UE, and transmitting, by the first UE, SCI in a PSCCH to the second UE. In embodiments, the second UE is operating in DRX mode, and the SCI in the PSCCH is received by the second UE during an active period of a DRX cycle of the second UE. In embodiments, the SCI includes configuration for a subsequent data transmission from the first UE to the second UE over the SL. In embodiments, transmitting the SCI in the PSCCH to the second UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, a method of wireless communication includes transmitting, by a base station serving a first UE and a second UE, a transmission grant to the first UE, the first UE in communication with the second UE over an SL. In embodiments, the second UE operating in DRX mode and the transmission grant causes the first UE to send SCI in a PSCCH to the second UE, the SCI including configuration for a subsequent data transmission from the first UE to the second UE over the SL. In embodiments, the SCI in the PSCCH is received by the second UE during an active period of a DRX cycle of the second UE, and receiving the SCI in the PSCCH from the first UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, an apparatus configured for wireless communication includes means for receiving, by a first UE in communication with a second UE over an SL, SCI in a PSCCH from the second UE. In aspects, the first UE is operating in DRX mode, and the PSCCH is received by the first UE during an active period of a DRX cycle of the first UE. The apparatus also includes means for extending, in response to receiving the SL control information in the PSCCH from the second UE, the active period of the DRX cycle in which the SL control information in the PSCCH is received from the second UE when the PSCCH indicates a subsequent data transmission over the SL from the second UE to the first UE In an additional aspect of the disclosure, an apparatus configured for wireless communication includes means for receiving, by a first UE in communication with a second UE over an SL, a transmission grant from a base station serving the first UE and the second UE, and means for transmitting, by the first UE, SCI in a PSCCH to the second UE. In embodiments, the second UE is operating in DRX mode, and the SCI in the PSCCH is received by the second UE during an active period of a DRX cycle of the second UE. In embodiments, the SCI includes configuration for a subsequent data transmission from the first UE to the second UE over the SL. In embodiments, transmitting the SCI in the PSCCH to the second UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, an apparatus configured for wireless communication includes means for transmitting, by a base station serving a first UE and a second UE, a transmission grant to the first UE, the first UE in communication with the second UE over an SL. In embodiments, the second UE operating in DRX mode and the transmission grant causes the first UE to send SCI in a PSCCH to the second UE, the SCI including configuration for a subsequent data transmission from the first UE to the second UE over the SL. In embodiments, the SCI in the PSCCH is received by the second UE during an active period of a DRX cycle of the second UE, and receiving the SCI in the PSCCH from the first UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, a non-transitory computer-readable medium having program code recorded thereon. The program code further includes code to receive, by a first UE in communication with a second UE over an SL, SCI in a PSCCH from the second UE. In aspects, the first UE is operating in DRX mode, and the PSCCH is received by the first UE during an active period of a DRX cycle of the first UE. The program code further includes code to extend, in response to receiving the SL control information in the PSCCH from the second UE, the active period of the DRX cycle in which the SL control information in the PSCCH is received from the second UE when the PSCCH indicates a subsequent data transmission over the SL from the second UE to the first UE In an additional aspect of the disclosure, a non-transitory computer-readable medium having program code recorded thereon. The program code further includes code to receive, by a first UE in communication with a second UE over an SL, a transmission grant from a base station serving the first UE and the second UE, and to transmit, by the first UE, SCI in a PSCCH to the second UE. In embodiments, the second UE is operating in DRX mode, and the SCI in the PSCCH is received by the second UE during an active period of a DRX cycle of the second UE. In embodiments, the SCI includes configuration for a subsequent data transmission from the first UE to the second UE over the SL. In embodiments, transmitting the SCI in the PSCCH to the second UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, a non-transitory computer-readable medium having program code recorded thereon. The program code further includes code to transmit, by a base station serving a first UE and a second UE, a transmission grant to the first UE, the first UE in communication with the second UE over an SL. In embodiments, the second UE operating in DRX mode and the transmission grant causes the first UE to send SCI in a PSCCH to the second UE, the SCI including configuration for a subsequent data transmission from the first UE to the second UE over the SL. In embodiments, the SCI in the PSCCH is received by the second UE during an active period of a DRX cycle of the second UE, and receiving the SCI in the PSCCH from the first UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, an apparatus configured for wireless communication is disclosed. The apparatus includes at least one processor, and a memory coupled to the processor. The processor is configured to receive, by a first UE in communication with a second UE over an SL, SCI in a PSCCH from the second UE. In aspects, the first UE is operating in DRX mode, and the PSCCH is received by the first UE during an active period of a DRX cycle of the first UE. The processor is further configured to extend, in response to receiving the SL control information in the PSCCH from the second UE, the active period of the DRX cycle in which the SL control information in the PSCCH is received from the second UE when the PSCCH indicates a subsequent data transmission over the SL from the second UE to the first UE In an additional aspect of the disclosure, an apparatus configured for wireless communication is disclosed. The apparatus includes at least one processor, and a memory coupled to the processor. The processor is configured to receive, by a first UE in communication with a second UE over an SL, a transmission grant from a base station serving the first UE and the second UE, and to transmit, by the first UE, SCI in a PSCCH to the second UE. In embodiments, the second UE is operating in DRX mode, and the SCI in the PSCCH is received by the second UE during an active period of a DRX cycle of the second UE. In embodiments, the SCI includes configuration for a subsequent data transmission from the first UE to the second UE over the SL. In embodiments, transmitting the SCI in the PSCCH to the second UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, an apparatus configured for wireless communication is disclosed. The apparatus includes at least one processor, and a memory coupled to the processor. The processor is configured to transmit, by a base station serving a first UE and a second UE, a transmission grant to the first UE, the first UE in communication with the second UE over an SL. In embodiments, the second UE operating in DRX mode and the transmission grant causes the first UE to send SCI in a PSCCH to the second UE, the SCI including configuration for a subsequent data transmission from the first UE to the second UE over the SL. In embodiments, the SCI in the PSCCH is received by the second UE during an active period of a DRX cycle of the second UE, and receiving the SCI in the PSCCH from the first UE causes the second UE to extend the active period of the DRX cycle of the second UE in which the SCI in the PSCCH is received when the PSCCH indicates the subsequent data transmission over the SL from the first UE to the second UE.

In an additional aspect of the disclosure, a method of wireless communication includes sending, by a first UE in communication with a second UE over an SL, SL DRX configuration, the SL DRX configuration specifying an SL DRX mode of the first UE with respect to the SL. In embodiments, the SL DRX mode of the first UE includes at least one SL DRX cycle with an active period for reception over the SL and an inactive period of reception over the SL. The method also includes receiving, by the first UE, SL control information (SCI) in a physical SL control channel (PSCCH) from the second UE. In embodiments, the SCI in the PSCCH is received by the first UE during the active period of the at least one SL DRX cycle of the first UE. The method further includes extending, in response to receiving the SCI in the PSCCH from the second UE, the active period of the at least one SL DRX cycle in which the SCI in the PSCCH is received from the second UE when the SCI in the PSCCH indicates a subsequent data transmission over the SL from the second UE to the first UE.

In an additional aspect of the disclosure, a method of wireless communication includes receiving, by a first UE in communication with a second UE over an SL, SL DRX configuration, the SL DRX configuration specifying an SL DRX mode of the second UE with respect to the SL. In embodiments, the SL DRX mode of the second UE includes at least one SL DRX cycle with an active period for reception over the SL and an inactive period of reception over the SL. The method further includes transmitting, by the first UE, SCI in a PSCCH to the second UE. In embodiments, the SCI in the PSCCH is received by the second UE during the active period of the at least one SL DRX cycle of the second UE, and transmitting the SCI in the PSCCH to the second UE causes the second UE to extend, in response to receiving the SCI in the PSCCH from the first UE, the active period of the at least one SL DRX cycle in which the SCI in the PSCCH is received from the first UE when the SCI in the PSCCH indicates a subsequent data transmission over the SL from the first UE to the second UE.

In an additional aspect of the disclosure, an apparatus for wireless communication includes means for sending, by a first UE in communication with a second UE over an SL, SL DRX configuration, the SL DRX configuration specifying an SL DRX mode of the first UE with respect to the SL. In embodiments, the SL DRX mode of the first UE includes at least one SL DRX cycle with an active period for reception over the SL and an inactive period of reception over the SL. The apparatus also includes means for receiving, by the first UE, SCI in a PSCCH from the second UE. In embodiments, the SCI in the PSCCH is received by the first UE during the active period of the at least one SL DRX cycle of the first UE. The apparatus also includes means for extending, in response to receiving the SCI in the PSCCH from the second UE, the active period of the at least one SL DRX cycle in which the SCI in the PSCCH is received from the second UE when the SCI in the PSCCH indicates a subsequent data transmission over the SL from the second UE to the first UE.

In an additional aspect of the disclosure, an apparatus for wireless communication includes means for receiving, by a first UE in communication with a second UE over an SL, SL DRX configuration, the SL DRX configuration specifying an SL DRX mode of the second UE with respect to the SL. In embodiments, the SL DRX mode of the second UE includes at least one SL DRX cycle with an active period for reception over the SL and an inactive period of reception over the SL. The apparatus further includes means for transmitting, by the first UE, SCI in a PSCCH to the second UE. In embodiments, the SCI in the PSCCH is received by the second UE during the active period of the at least one SL DRX cycle of the second UE, and transmitting the SCI in the PSCCH to the second UE causes the second UE to extend, in response to receiving the SCI in the PSCCH from the first UE, the active period of the at least one SL DRX cycle in which the SCI in the PSCCH is received from the first UE when the SCI in the PSCCH indicates a subsequent data transmission over the SL from the first UE to the second UE.

In an additional aspect of the disclosure, a non-transitory computer-readable medium having program code recorded thereon. The program code includes code to send, by a first UE in communication with a second UE over an SL, SL DRX configuration, the SL DRX configuration specifying an SL DRX mode of the first UE with respect to the SL. In embodiments, the SL DRX mode of the first UE includes at least one SL DRX cycle with an active period for reception over the SL and an inactive period of reception over the SL. The program code further includes code to receive, by the first UE, SCI in a PSCCH from the second UE. In embodiments, the SCI in the PSCCH is received by the first UE during the active period of the at least one SL DRX cycle of the first UE. The program code further includes code to extend, in response to receiving the SCI in the PSCCH from the second UE, the active period of the at least one SL DRX cycle in which the SCI in the PSCCH is received from the second UE when the SCI in the PSCCH indicates a subsequent data transmission over the SL from the second UE to the first UE.

In an additional aspect of the disclosure, a non-transitory computer-readable medium having program code recorded thereon. The program code includes code to receive, by a first UE in communication with a second UE over an SL, SL DRX configuration, the SL DRX configuration specifying an SL DRX mode of the second UE with respect to the SL. In embodiments, the SL DRX mode of the second UE includes at least one SL DRX cycle with an active period for reception over the SL and an inactive period of reception over the SL. The program code further includes code to transmit, by the first UE, SCI in a PSCCH to the second UE. In embodiments, the SCI in the PSCCH is received by the second UE during the active period of the at least one SL DRX cycle of the second UE, and transmitting the SCI in the PSCCH to the second UE causes the second UE to extend, in response to receiving the SCI in the PSCCH from the first UE, the active period of the at least one SL DRX cycle in which the SCI in the PSCCH is received from the first UE when the SCI in the PSCCH indicates a subsequent data transmission over the SL from the first UE to the second UE.

In an additional aspect of the disclosure, an apparatus configured for wireless communication is disclosed. The apparatus includes at least one processor, and a memory coupled to the processor. The processor is configured to send, by a first UE in communication with a second UE over an SL, SL DRX configuration, the SL DRX configuration specifying an SL DRX mode of the first UE with respect to the SL. In embodiments, the SL DRX mode of the first UE includes at least one SL DRX cycle with an active period for reception over the SL and an inactive period of reception over the SL. The processor is further configured to receive, by the first UE, SCI in a PSCCH from the second UE. In embodiments, the SCI in the PSCCH is received by the first UE during the active period of the at least one SL DRX cycle of the first UE. The processor is further configured to extend, in response to receiving the SCI in the PSCCH from the second UE, the active period of the at least one SL DRX cycle in which the SCI in the PSCCH is received from the second UE when the SCI in the PSCCH indicates a subsequent data transmission over the SL from the second UE to the first UE.

In an additional aspect of the disclosure, an apparatus configured for wireless communication is disclosed. The apparatus includes at least one processor, and a memory coupled to the processor. The processor is configured to receive, by a first UE in communication with a second UE over an SL, SL DRX configuration, the SL DRX configuration specifying an SL DRX mode of the second UE with respect to the SL. In embodiments, the SL DRX mode of the second UE includes at least one SL DRX cycle with an active period for reception over the SL and an inactive period of reception over the SL. The processor is further configured to transmit, by the first UE, SCI in a PSCCH to the second UE. In embodiments, the SCI in the PSCCH is received by the second UE during the active period of the at least one SL DRX cycle of the second UE, and transmitting the SCI in the PSCCH to the second UE causes the second UE to extend, in response to receiving the SCI in the PSCCH from the first UE, the active period of the at least one SL DRX cycle in which the SCI in the PSCCH is received from the first UE when the SCI in the PSCCH indicates a subsequent data transmission over the SL from the first UE to the second UE.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a block diagram illustrating example blocks executed by a user equipment to implement aspects of the present disclosure.

FIG. 7 is a block diagram illustrating example blocks executed by a user equipment to implement aspects of the present disclosure.

FIG. 8 is a block diagram illustrating example blocks executed by a base station to implement aspects of the present disclosure.

FIG. 12 is a block diagram illustrating example blocks executed by a user equipment to implement aspects of the present disclosure.

FIG. 13 is a block diagram illustrating example blocks executed by a user equipment to implement aspects of the present disclosure.

DETAILED DESCRIPTION

Figure 1:
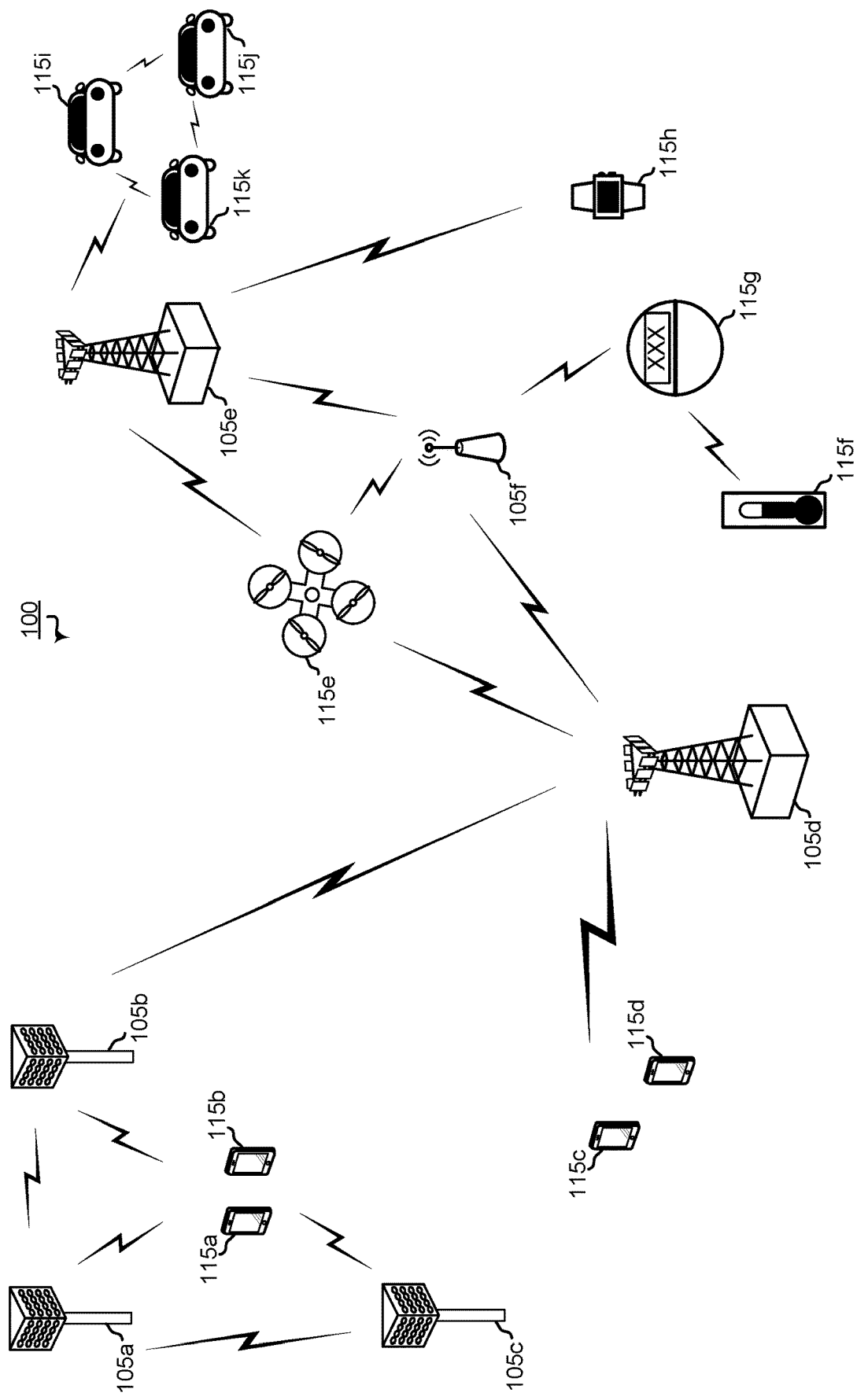
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
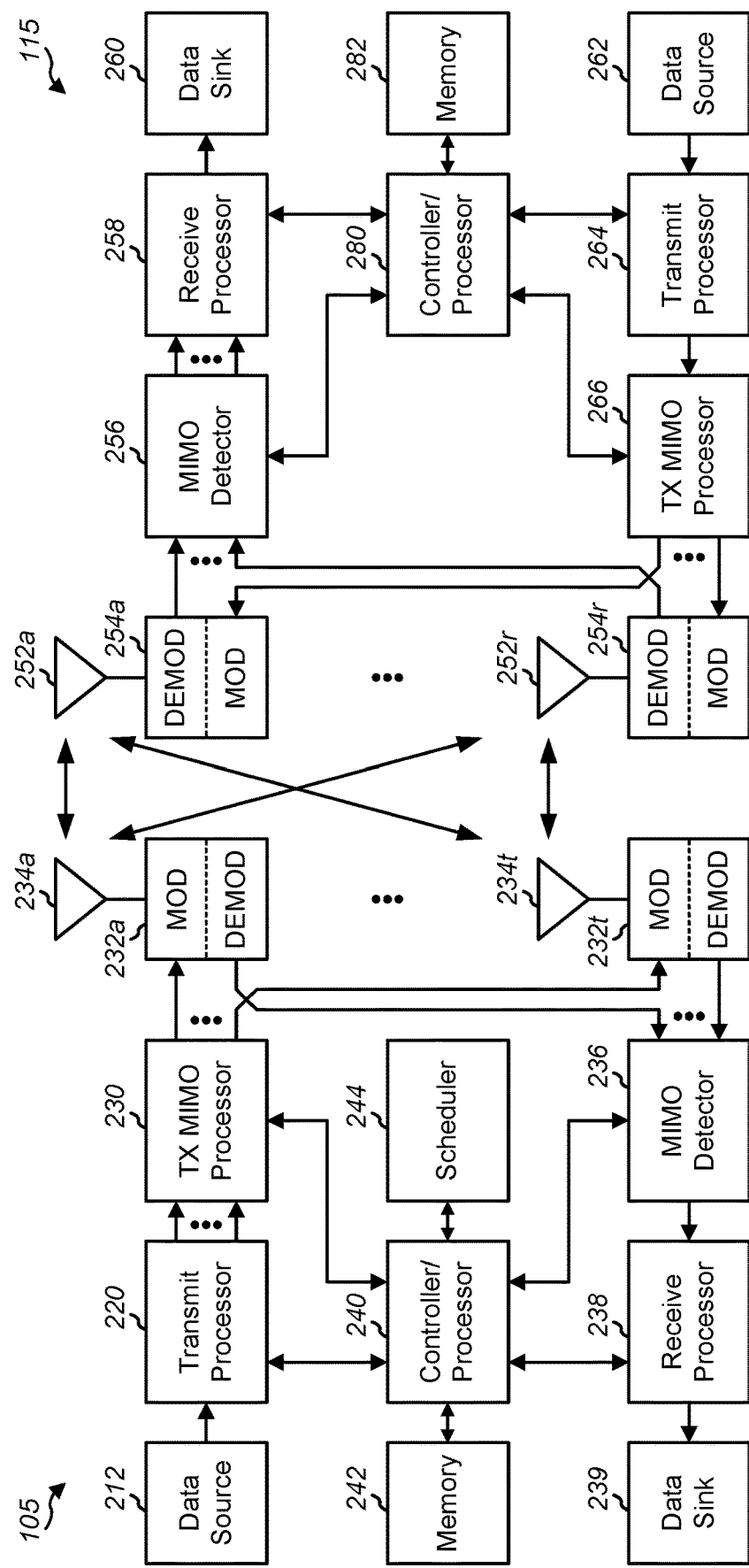
FIG. 2 is a block diagram conceptually illustrating a design of a base station and a UE configured according to some aspects of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6-8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
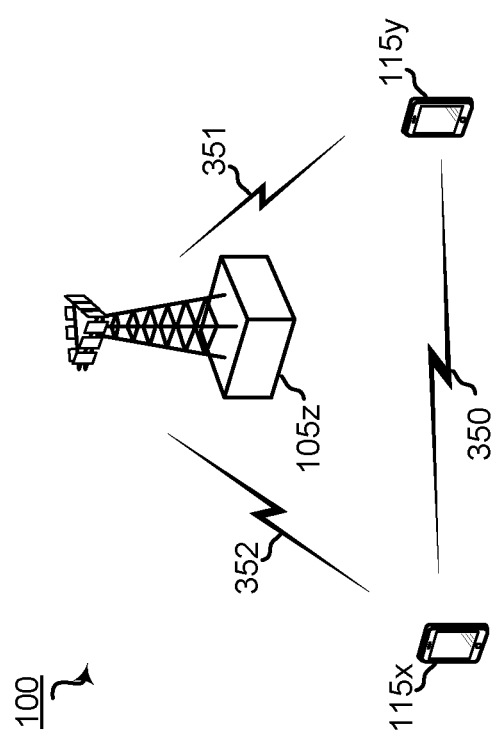
FIG. 3 is a block diagram is a block diagram illustrating details of an example wireless communication system implementing a sidelink communication scheme.

FIG. 3 is a block diagram illustrating details of an example wireless communication system. The wireless communication system may include an implementation of wireless network 100. Wireless network 100 may include base station 105z, UE 115x, and UE 115y. It will be appreciated that network 100 may include further components such as additional base station and additional UEs. Thus, the discussion with respect to base station 105z, UE 115x, and UE 115y of FIG. 3 is by way of example, and not intended to be limiting in any way. In particular, UE 115x and UE 115y may be in communication with base station 105z. For example, UE 115x may communicate with base station 105z via link 352. Link 352 may include an uplink and/or a downlink. In some examples, UE 115y may communicate with base station 105z via link 351. Link 351 may include an uplink and/or a downlink. In some implementations, base station 105z may be a serving base station to one or both of UE 115x and UE 115y.

As shown in FIG. 3, UE 115x and UE 115y may be in communication with each other via SL 350. In some cases, SL 350 may be a direct link via which UE 115x sends/receives messages directly to/from UE 115y, and via which UE 115y sends/receives messages directly to/from UE 115x. In implementations, UE 115x and UE 115y may be configured to follow an SL communication scheme in which transmission/reception takes place only in designated resources (e.g., time, frequency, etc.). As such, SL communications between UE 115x and UE 115y may be restricted to particular resources, and in these implementations no SL communications between UE 115x and UE 115y may take place outside these resources.

In some implementations, SL communications between UE 115x and UE 115y may operate in one of various modes. For example, SL communications between UE 115x and UE 115y over SL 350 may operate in SL mode 1. In SL mode 1, a base station (e.g., base station 105z) may schedule SL transmissions. For example, in SL mode 1, a UE may transmit to another UE over the SL, but the transmitting UE must obtain a transmission grant from the serving base station before it is allowed to transmit to the receiving UE over the SL. In SL mode 1, without requesting a transmission grant, the transmitting UE is not allowed to transmit to the receiving UE over the SL. For example, UE 115x may wish to transmit to UE 115y over SL 350. In that case, UE 115x may transmit a request for a transmission grant to base station 105z. The request for the transmission grant may be sent over an uplink from UE 115x to base station 105z. Once base station grants the transmission grant to the UE 115x, UE 115x may transmit to UE 115y over SL 350.

In implementations, the transmission grant may be sent over a downlink (e.g., in a downlink control information (DCI) message) from base station 105z to UE 115x. The transmission grant may be provided in a DCI message that includes a resource allocation to the transmitting UE. The transmission grant may be provided in a DCI message that includes a resource allocation to the transmitting UE. For example, the transmission grant from base station 105z may include an indication to the transmitting UE of which resource to use to transmit the SL transmission to the receiving UE over the SL. For example, the transmission grant sent by base station 105z to UE 115x may include an indication of which resources UE 115x is to use in transmitting to UE 115y.

In another example, SL communications between UE 115x and UE 115y over SL 350 may operate in SL mode 2. In SL mode 2, a UE (e.g., UE 115x and/or UE 115y) may schedule SL transmissions to another UE over an SL. For example, in SL mode 2, a UE may transmit to another UE over the SL, without the transmitting UE obtaining a transmission grant from the serving base station before it is allowed to transmit to the receiving UE over the SL. For example, UE 115x may wish to transmit to UE 115y over SL 350. In that case, UE 115x may schedule the SL transmission to UE 115y and does not need to request a transmission grant from base station 105z, or another base station. On the other hand, in mode 1, the transmitting UE must obtain a transmission grant from a serving base station before transmitting to another UE over an SL.

In some implementations, the SL transmission may follow a particular scheme. For example, once the transmission grant is received by UE 115x, UE 115x may transmit SL control information (SCI) to UE 115y (e.g., using the resources specified in the transmission grant). In implementations, the SCI may be transmitted over a physical SL control channel (PSCCH) from UE 115x to UE 115y. The SCI may be configured to indicate to UE 115y that UE 115x is to transmit a subsequent data transmission to the UE 115y (e.g., a data transmission over SL 350 from UE 115x that is subsequent to the transmission of the SCI from UE 115x). In implementations, the subsequent data transmission may be a data transmission over a physical SL shared channel (PSSCH) from UE 115x to UE 115y. In implementations, the SCI may include an indication of which resources UE 115x is to use to transmit the subsequent data transmission (e.g., over the PSSCH), as well as other transmission parameters.

In implementations, after transmitting the SCI to UE 115x, UE 115x may transmit the subsequent data transmission over the PSSCH using the resources specified in the SCI. In some cases, UE 115x may, after receiving the PSSCH transmission, provide feedback (e.g., over a physical SL feedback channel (PSFCH)).

Figure 4:
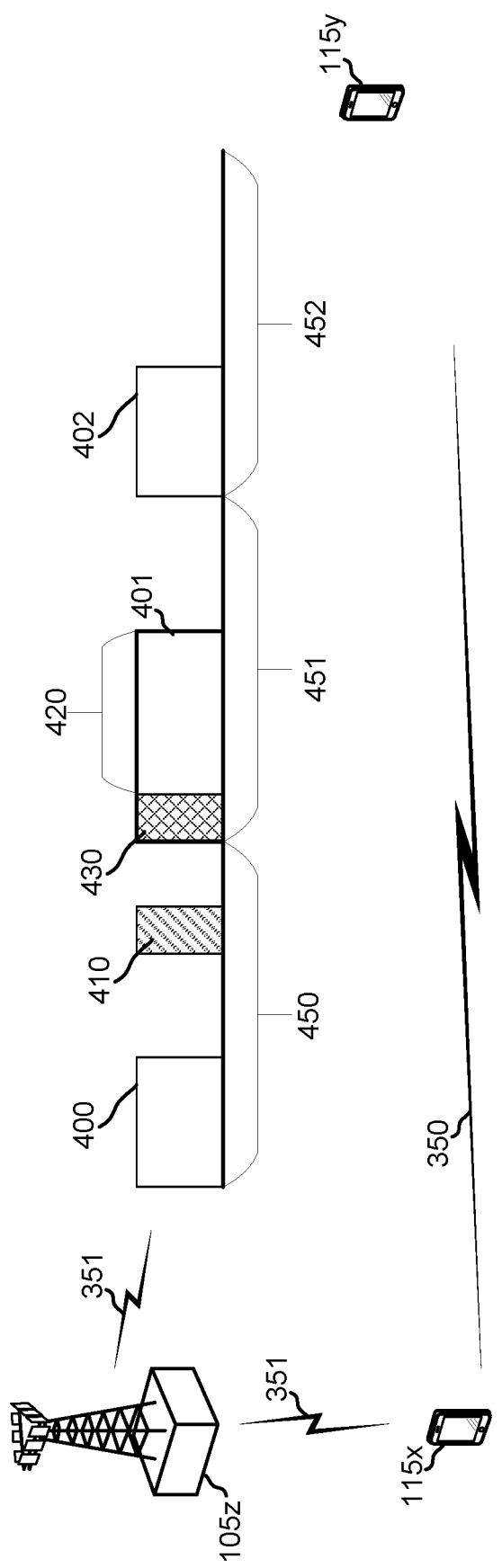
FIG. 4 is a diagram illustrating operations in DRX mode 1.

In some implementations, the receiving UE (e.g., UE 115y of FIG. 3) may operate in discontinuous reception (DRX) mode. FIG. 4 is a diagram illustrating UE operations in DRX mode. As can be seen, in DRX mode, UE 115y may discontinuously monitor for transmissions from base station 105z (e.g., transmissions of control information such as DCI over a PDCCH). In these cases, UE 115y may monitor for DCI during active periods, but may not monitor for DCI outside of active periods (e.g., during inactive periods). For example, as can be seen in FIG. 4, UE 115y may be configured to include one or more DRX cycles (e.g., 450-452). The DRX cycles of the UE 115y may include active periods and inactive periods. For example, DRX cycles 450-452 may include active periods 400-402, respectively. In these implementations, UE 115y may monitor for control information from base station 105z only during active periods 400-402. As shown in FIG. 4, each DRX cycle of UE 115y begins with an active period during which UE 115y monitors for DCI transmissions from base station 105z. For example, DRX cycle 450 begins with active period 400, DRX cycle 451 begins with active period 401, and DRX cycle 452 begins with active period 402.

In implementations, a base station wishing to transmit data to a DRX UE may first send a wakeup signal (WUS) to the DRX UE to ensure that the UE is "awake" during the next active period to ensure that any transmission (e.g., DCI transmission) is detected and received by the DRX UE during the next active period. In this cases, UE 115y may monitor for a WUS even during inactive periods. For example, base station 105z may transmit WUS 410 to UE 115y during the inactivity period of DRX cycle 450. In response to receiving WUS 410, UE 115y may monitor for a DCI transmission (e.g., over a PDCCH) from base station 105z during active period 401 of DRX cycle 451. In some cases, UE 115y may power up its transceiver and/or any other component in order to receive the DCI transmission. In some implementations, where a WUS is not received, UE 115y may not be configured or DCI reception even during a period of activity.

In implementations, in response to receiving the PDCCH transmission (e.g., the DCI transmission over the PDCCH), the active period in which the PDCCH including the DCI is received is extended. In some cases, the active period is extended by starting and/or restarting an inactivity timer associated with the DRX cycle in which the PDCCH is received. For example, as shown in FIG. 4, in response to UE 115y receiving DCI over PDCCH 430, active period 401 may be extended by extension period 420 after the end of the PDCCH reception.

However, current DRX communication schema do not address the SL communications between UE 115x and UE 115y over SL 350. In this case, UE 115y is not configured for DRX communications with respect to UE 115x. As such, when UE 115y operates in DRX mode, SL communications between UE 115x and 115y is not possible. On the other hand, in order to support SL communications, UE 115y would not be able to operate in DRX mode and thus any power savings due to DRX mode would be lost. What is more, there is currently no existing solution to address these deficiencies of existing systems.

Various aspects of the present disclosure are directed to systems and methods for configuring and providing sidelink DRX communications. In aspects, the techniques disclosed herein may be applicable to sidelink operations in mode 1 and/or mode 2.

Aspects of the present disclosure provide for a UE operating in SL mode 1 to implement a DRX scheme in which the UE operating in SL mode 1 is able to provide DRX communications with a serving base station, while concurrently maintaining DRX communications over an SL with another UE. In some embodiments, the DRX scheme between the DRX UE and the base station may be extended to receptions from the transmitting UE over the SL. In aspects, a DRX UE may monitor for either one or both of transmissions in a DL (e.g., from a base station) and in an SL (e.g., from a transmitting SL UE), and may extend the active period (e.g., by starting/restarting an inactivity timer as described above) based on events on both the link with the base station or the SL with another UE. In embodiments, the DRX UE may be configured to start or restart the inactivity timer (e.g., based on a drx-InactivityTimer parameter) in the first symbol after the end of a PDCCH reception when the PDCCH indicates a subsequent transmission (either a downlink transmission or an uplink transmission), or in the first symbol after the end of a PSCCH reception when the PSCCH indicates a subsequent SL transmission. In aspects, the described techniques may be referred to as DRX with SL in mode 1.

Aspects of the present disclosure provide for a UE operating in SL mode 2 to implement a DRX scheme in which the UE is able to provide DRX communications with a serving base station, while concurrently maintaining DRX communications over an SL with another UE, while in SL mode 2. In some embodiments, an SL DRX scheme for communications between the DRX UE and other UEs over an SL may be provided in addition to a Uu DRX scheme between the DRX UE and a base station. In aspects, a DRX UE may monitor the SL for transmissions from other UEs using the SL DRX configuration, and may concurrently monitor for transmissions in a DL (e.g., from a base station)

using a Uu DRX configuration, where the SL DRX configuration and the Uu DRX configuration may be different. In embodiments, an active period of an SL DRX cycle (e.g., a DRX cycle of the SL DRX configuration for the SL between the DRX UE and another UE) may be extended (e.g., by starting/restarting an inactivity timer) based on events on the SL. In additional embodiments, an active period of a Uu DRX cycle (e.g., a DRX cycle of the Uu DRX configuration for the link between the base station and the DRX UE) may be extended (e.g., by starting/restarting an inactivity timer) based on events on the link between the base station and the DRX UE.

In embodiments, the DRX UE may be configured to start or restart an inactivity timer of an SL DRX cycle in the first symbol after the end of a control channel (e.g., a physical SL control channel (PSCCH)) reception when the PSCCH indicates a subsequent SL transmission from another UE. In embodiments, the DRX UE may be configured to start or restart an inactivity timer of an Uu DRX cycle in the first symbol after the end of a control channel (e.g., a PDCCH)) reception when the PDCCH indicates a subsequent transmission (either a downlink transmission or an uplink transmission) from a base station. In aspects, the described techniques may be referred to as DRX with SL in mode 2.

Figure 5:
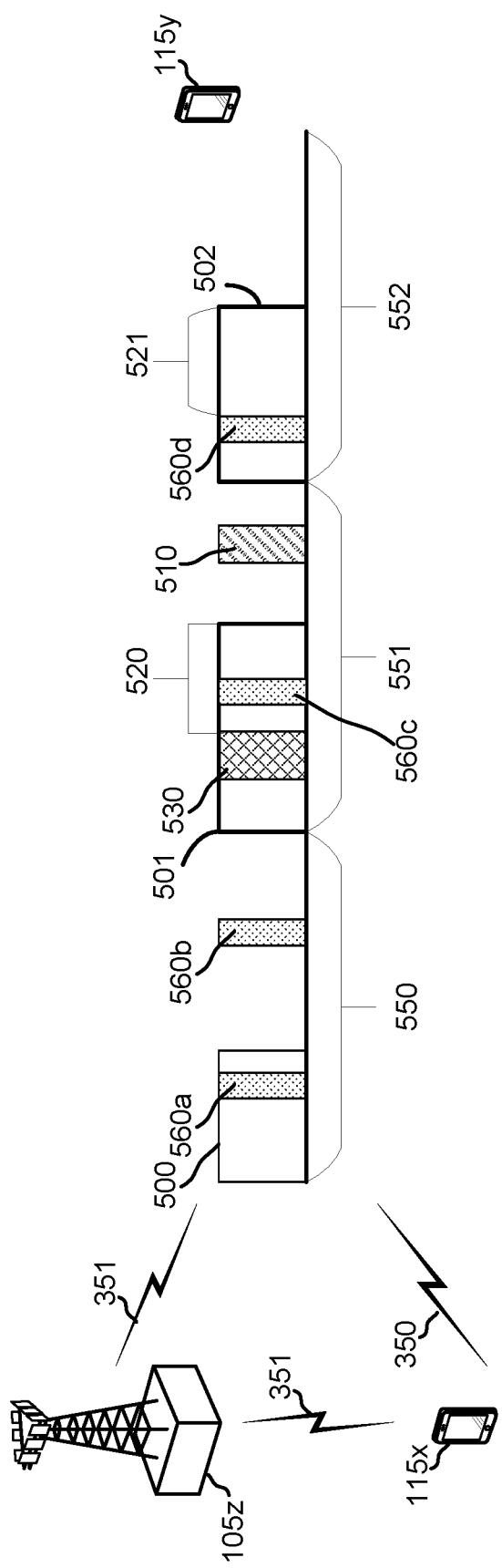
FIG. 5 is a diagram illustrating DRX in SL mode 1 operations implemented in accordance with some aspects of the present disclosure.

FIG. 5 is a diagram illustrating an example implementation of an SL DRX process to implement one aspect of the present disclosure. As shown in FIG. 5, base station 105z may be in DRX communications with UE 115y over link 351. Concurrently, UE 115y may also be in SL DRX communications with UE 115x over SL 350. As illustrated, UE 115y may be configured to include one or more DRX cycles (e.g., 550-552). The DRX cycles of UE 115y may include active periods and inactive periods. For example, DRX cycles 550-552 may include active periods 500-502, respectively. In these aspects, UE 115y may monitor for control information from either base station 105z and/or from UE 115x only during active periods 500-502. In these aspects, UE 115y may monitor for DCI and/or SCI during active periods, but may not monitor for DCI and/or SCI outside of active periods (e.g., during inactive periods). When a DCI (e.g., in a PDCCH) and/or SCI (e.g., in a PSCCH) is detected or received by UE 115y during an active period, the active period during which the DCI and/or SCI is received may be extended. In that sense, the active period of a DRX cycle of UE 115y may be a function of events in the link between base station 105z and UE 115y and in the SL between UE 115y and UE 115x.

As shown in FIG. 5 each DRX cycle of UE 115y begins with an active period during which UE 115y monitors for DCI transmissions from base station 105z, and/or monitors for SCI from UE 115x. For example, DRX cycle 550 begins with active period 500, DRX cycle 551 begins with active period 501, and DRX cycle 552 begins with active period 502.

In the particular example illustrated in FIG. 5, base station 105z may transmit DCI in PDCCH 530 to UE 115y during active period 501 of DRX cycle 551. In some embodiments, a WUS may be sent from base station 105z to UE 115y prior to the transmission of PDCCH 530 to ensure that UE 115y is monitoring for PDCCH 530 during active period 501. As described above, in response to receiving the PDCCH transmission (e.g., the DCI transmission over PDCCH 530), UE 115y may extend active period 501 by extension period 520 when the DCI in PDCCH 530 indicates that a subsequent data transmission is to be transmitted to UE 115y from base station 105z. In embodiments, the subsequent data transmission may be received by UE 115y during the extended active period. In embodiments, active period 501 may be extended by starting and/or restarting an inactivity timer associated with DRX cycle 551.

As also shown in FIG. 5, SL resources 560a-d may occur during DRX cycles 550-552. As described above, SL transmissions between UE 115x and 115y may be confined or restricted to these SL resources 560a-d. As such, UE 115x may transmit using any of SL resources 560a-d based on a grant from base station 105z. For example, UE 115x may desire to transmit data to UE 115y over SL 350. In this case, UE 115x may send a request for a transmission grant to base station 105z (e.g., via uplink of link 351). In some embodiments, the transmission grant request sent by UE 115x may include an indication that the transmission grant requested is for transmission over SL 350 to UE 115y. In additional or alternative embodiments, the transmission grant request sent by UE 115x may not include an explicit indication that the transmission grant requested is for transmission over SL 350 to UE 115y. In these cases, base station 105z may determine that the target of the transmission grant request from UE 115x may be UE 115y based on a buffer status report (BSR) from UE 115x.

In aspects, base station 105z may grant the request for a transmission grant to UE 115x to transmit over SL 350. In this case, base station 105z may send the transmission grant to UE 115x. In embodiments, the transmission grant may include an indication that the transmission grant requested is for transmission over SL 350 to UE 115y. In embodiments, the transmission grant may be provided to UE 115x in a DCI message that includes a resource allocation of SL resources in which UE 115x may transmit to UE 115y. In embodiments, the allocated SL resources may be part of the SL resources to which SL communications may be restricted. For example, base station 105z may allocate SL resource 560d to UE 115x for transmission of data to UE 115y. In this example, SL resource 560d falls within active period 502 of DRX cycle 552.

In embodiments, UE 115y may monitor for SCI transmissions from UE 115x during active period 502. In some embodiments, prior to the SCI transmission in SL resource 506d from UE 115x, base station 105z may send WUS 510 to UE 115y to ensure that UE 115y is monitoring for SCI transmissions over the SL in SL resource 560d during active period 502. In embodiments, WUS 510 may be transmitted to UE 115y by base station 105z in response to base station 105z granting of the transmission grant to UE 115x.

In embodiments, upon receiving the transmission grant to transmit to UE 115y over SL 350 in SL resource 560d, UE 115x may transmit control information (e.g., SCI) in a PSCCH over SL 350, in SL resource 560d, to UE 115y. In embodiments, the SCI may include an indication of which SL resources UE 115x is to use to transmit a subsequent data transmission (e.g., data transmission over the PSSCH), as well as other transmission parameters.

In implementations, after transmitting the SCI to UE 115y in SL resource 560d during active period 502 over SL 350, UE 115x may transmit the subsequent data transmission over the PSSCH using the resources specified in the SCI. In some cases, UE 115y may, after receiving the PSSCH transmission, provide feedback (e.g., over a PSFCH).

In embodiments, in response to receiving the SCI transmission in the PSCCH in SL resource 560d during active period 502, UE 115y may extend active period 502 by extension period 521 when the SCI in the PSCCH indicates that the subsequent data transmission is to be transmitted to UE 115y from UE 115x.

In some embodiments, base station 105z may transmit data (e.g., DCI) to UE 115y during the extended active period of DRX cycle 552. In embodiments, active period 502 may be extended by starting and/or restarting an inactivity timer associated with DRX cycle 552.

Figure 9:
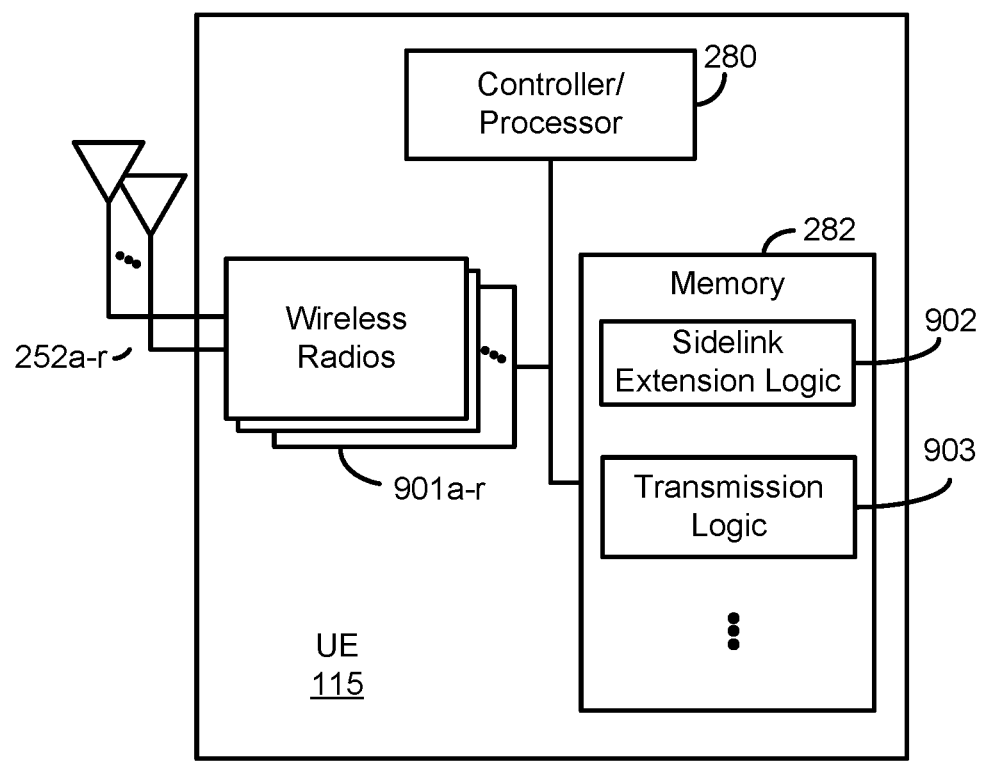
FIG. 9 is a block diagram conceptually illustrating a design of a user equipment configured according to some embodiments of the present disclosure.

FIG. 6 is a block diagram illustrating example blocks executed to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 901a-r and antennas 252a-r. Wireless radios 901a-r includes various components and hardware, as illustrated in FIG. 2 for UE 115, including modulator/demodulators 254a-r, MIMO detector 256, receive processor 258, transmit processor 264, and TX MIMO processor 266.

It is noted that the description of the example blocks of FIG. 6 is from the perspective of the first UE, which may refer to a UE operating in DRX with SL in mode 1 (e.g., UE 115y described above). In this example, the first UE may be in SL communications with a second UE (e.g., UE 115x). In embodiments, a base station (e.g., base station 105z) may serve one or both of the first UE and the second UE.

At block 600, a first UE in communication with a second UE over an SL receives SCI in a PSCCH from the second UE over the SL. For example, the first UE (e.g., UE 115) engaged in communications over an SL may receive SCI via antennas 252a-r and wireless radios 901a-r. In aspects, as noted above, the first UE may be operating in DRX mode (e.g., DRX mode 1), and the PSCCH may be received by the first UE during an active period of a DRX cycle of the first UE.

In embodiments, the SCI received in the PSCCH from the second UE over the SL may be transmitted by the second UE in response to the second UE receiving a transmission grant from the base station. In this case, as will be described in more detail below with respect to FIG. 7, the second UE may request a transmission grant from the base station, and the transmission grant request may include an indication by the second UE that the first UE is the target receiver of the SL transmission by the second UE. In some embodiments, the second UE may not include the indication, but the base station may determine that the first UE is the target receiver of the SL transmission by the second UE based on a BSR associated with the second UE.

In embodiments, the transmission grant may include an indication that the SCI transmission, and a subsequent data transmission, is to be made over the SL from the second UE to the first UE, and that the first UE is the intended target of the SL transmission. In embodiments, the indication that the subsequent data transmission over the sidelink is intended for the first UE is included in a DCI message sent from the base station to the second UE.

In embodiments, the transmission grant may include configuration for the transmission of the SCI over the SL to the first UE. In embodiments, the configuration may include specifying which SL resources are to be used by the second UE to transmit the SCI and, in some embodiments, the subsequent data transmission.

In some embodiments, the first UE receives, prior to receiving the SCI in the PSCCH from the second UE, a WUS from the base station. Based on receiving the WUS, the first UE may be activated for reception during the active time. In embodiments, the first UE monitors, in response to receiving the WUS from the base station, the SL between the first UE and the second UE for transmission of the SCI from the second UE. In embodiments, the WUS is transmitted from the base station to the first UE in response to the base station granting the transmission grant to the second UE.

At block 601, the first UE extends, in response to receiving the SCI in the PSCCH from the second UE, the active period of the DRX cycle in which the SCI in the PSCCH is received from the second UE when the PSCCH indicates that a subsequent data transmission over the SL from the second UE to the first UE is to be transmitted. In order to implement the functionality for such operations, UE 115, under control of controller/processor 280, executes SL extension logic 902, stored in memory 282. The functionality implemented through the execution environment of SL extension logic 902 allows for UE 115 to perform active period extension operations according to the various aspects herein.

In embodiments, extending the active period of the DRX cycle includes one of: starting an inactivity timer associated with the DRX cycle upon an end of the reception of the SCI in the PSCCH from the second UE, and restarting the inactivity timer associated with the DRX cycle upon the end of the reception of the SCI in the PSCCH from the second UE.

In embodiments, the first UE may receive a DCI message from the base station during the extended active period of the DRX cycle. In these embodiments, the DCI received by the first UE subsequent to receiving the SCI in the PSCCH from the second UE.

FIG. 7 is a block diagram illustrating example blocks executed to implement one aspect of the present disclosure. The example blocks will also be described with respect to UE 115 as illustrated in FIG. 9. It is noted that the description of the example blocks of FIG. 7 is from the perspective of the first UE, which in this discussion may refer to a UE (e.g., UE 115x described above) in communication with a second UE that is operating in DRX with SL in mode 1 (e.g., UE 115y described above). In embodiments, a base station (e.g., base station 105z) may serve one or both of the first UE and the second UE.

At block 700, a first UE in communication with a second UE over an SL receives a transmission grant from a base station serving the first UE and the second UE. For example, the first UE (e.g., UE 115) engaged in communications over a link with the base station, may receive a transmission grant via antennas 252a-r and wireless radios 901a-r.

In embodiments, the transmission grant received from the base station may be received in response to the first UE transmitting a request for a transmission grant to the base station. In embodiments, the transmission grant request may include an indication by the first UE that the second UE is the target receiver of an SL transmission by the first UE. In some embodiments, the first UE may not include the indication, but the base station may determine that the second UE is the target receiver of the SL transmission by the first UE based on a BSR associated with the first UE.

In embodiments, the transmission grant may include an indication that the SCI transmission, and a subsequent data transmission, is to be made over the SL from the first UE to the second UE, and that the second UE is the intended target of the SL transmission.

In embodiments, the indication that the subsequent data transmission over the SL is intended for the second UE is included in a DCI message sent from the base station to the first UE.

In embodiments, the transmission grant may include configuration for the transmission of SCI in a PSCCH over the SL to the second UE. In embodiments, the configuration may include specifying which SL resources are to be used by the first UE to transmit the SCI and, in some embodiments, the subsequent data transmission.

In some embodiments, the second UE receives, prior to receiving the SCI in the PSCCH from the first UE, a WUS from the base station. Based on receiving the WUS, the second UE may be activated for reception during the active time. In embodiments, activating the second UE for reception may include the second UE monitoring, in response to receiving the WUS from the base station, the SL between the first UE and the second UE for transmission of the SCI from the first UE. In embodiments, the WUS is transmitted from the base station to the second UE in response to the base station granting the transmission grant to the first UE.

At block 701, the first UE transmits, by the first UE, SCI in the PSCCH to the second UE. For example, the first UE (e.g., UE 115) engaged in communications over an SL with the second UE, may transmit SCI in the PSCCH via antennas 252a-r and wireless radios 901a-r. In embodiments, the second UE may be operating in DRX mode (e.g., DRX mode 1), and the SCI in the PSCCH may be received by the second UE during an active period of a DRX cycle of the second UE. In embodiments, the SCI may include configuration for a subsequent data transmission from the first UE to the second UE over the SL.

In some embodiments, transmitting the SCI in the PSCCH to the second UE causes the second UE to extend the active period of the DRX cycle of the second UE in which the SCI in the PSCCH is received when the PSCCH indicates the subsequent data transmission over the SL from the first UE to the second UE.

In embodiments, extending the active period of the DRX cycle includes one of: starting an inactivity timer associated with the DRX cycle upon an end of the reception of the SCI in the PSCCH from the first UE, and restarting the inactivity timer associated with the DRX cycle upon the end of the reception of the SCI in the PSCCH from the first UE.

It is noted that the description of the example blocks of FIG. 6 is from the perspective of the first UE, which may refer to a UE operating in DRX with SL in mode 1 (e.g., UE 115y described above). In this example, the first UE may be in SL communications with a second UE (e.g., UE 115x). In embodiments, a base station (e.g., base station 105z) may serve one or both of the first UE and the second UE.

Figure 10:
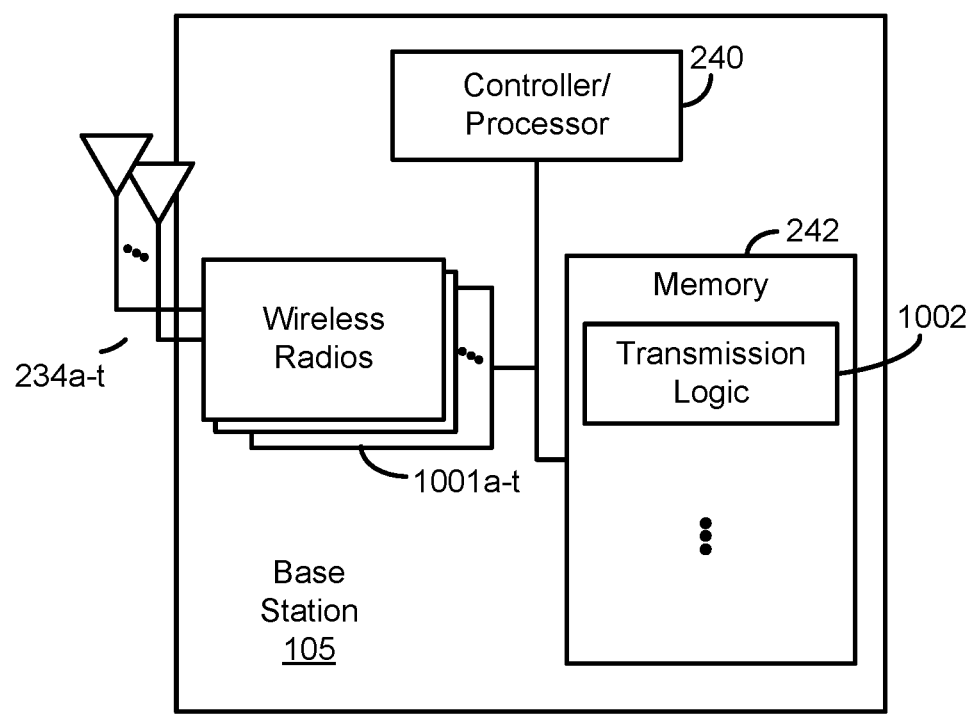
FIG. 10 is a block diagram conceptually illustrating a design of a base station configured according to some embodiments of the present disclosure.

FIG. 8 is a block diagram illustrating example blocks executed to implement one aspect of the present disclosure. The example blocks will also be described with respect to base station 105 as illustrated in FIG. 10. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t includes various components and hardware, as illustrated in FIG. 2 for base station 105, including modulator/demodulators 232a-t, MIMO detector 236, receive processor 238, transmit processor 220, and TX MIMO processor 230.

It is noted that the description of the example blocks of FIG. 8 is from the perspective of a base station, which may refer to a base station (e.g., base station 105z) serving one or both of a first UE and a second UE. In this example, the second UE may be a UE operating in DRX with SL in mode 1 (e.g., UE 115y described above), and the first UE (e.g., UE 115x) may be in SL communications with the second UE.

At block 800, a base station serving a first UE and a second UE, transmits a transmission grant to the first UE. In order to implement the functionality for such operations, base station 105, under control of controller/processor 240, executes transmission logic 1002, stored in memory 242. The functionality implemented through the execution environment of transmission logic 1002 allows for base station 105 to perform transmission grant transmission operations according to the various aspects herein. In embodiments, the first UE may be in communication with the second UE over an SL, and the second UE may be operating in DRX mode.

In embodiments, the transmission grant may be transmitted in a DCI to the first UE, and may be transmitted in response to receiving a request for the transmission grant from the first UE. In embodiments, the transmission grant request may include an indication by the first UE that the second UE is the target receiver of an SL transmission by the first UE. In some embodiments, the first UE may not include the indication, but the base station may determine that the second UE is the target receiver of the SL transmission by the first UE based on a BSR associated with the first UE.

In embodiments, the transmission grant may include an indication that the SCI transmission, and a subsequent data transmission, is to be made over the SL from the first UE to the second UE, and that the second UE is the intended target of the SL transmission. In embodiments, the indication that the subsequent data transmission over the SL is intended for the second UE is included in a DCI message sent from the base station to the first UE.

In embodiments, the transmission grant may include configuration for the transmission of SCI in a PSCCH over the SL from the first UE to the second UE. In embodiments, the configuration may include specifying which SL resources are to be used by the first UE to transmit the SCI and, in some embodiments, the subsequent data transmission.

In some embodiments, transmitting the transmission grant to the first UE may cause the first UE to send the SCI in the PSCCH to the second UE via the SL between the first UE and the second UE. In embodiments, the SCI in the PSCCH may be transmitted by the first UE and/or received by the second UE during an active period of a DRX cycle of the second UE.

In embodiments, the base station may transmit, in response to transmitting the transmission grant to the first UE, a WUS to the second UE. The WUS may be transmitted to ensure that the second UE is "awake" during a next activity period of the DRX cycle to monitor for SCI transmissions from the first UE. In some embodiments, the base station nay transmit the WUS to the second UE prior to the first UE transmitting the SCI in the PSCCH to the second UE.

In embodiments, receiving the SCI in the PSCCH from the first UE causes the second UE to extend the active period of the DRX cycle of the second UE in which the SCI in the PSCCH is received, when the PSCCH indicates the subsequent data transmission over the sidelink from the first UE to the second UE.

In embodiments, causing the second UE to extend the active period of the DRX cycle includes one of: causing the second UE to start an inactivity timer associated with the DRX cycle upon an end of the reception of the SCI in the PSCCH from the first UE, and causing the second UE to restart the inactivity timer associated with the DRX cycle upon the end of the reception of the SCI in the PSCCH from the first UE.

In embodiments, the base station may transmit a DCI message to the second UE during the extended active period of the DRX cycle. In these embodiments, the DCI transmitted to the first UE may be subsequent to receiving the SCI in the PSCCH from the second UE.

Figure 11:
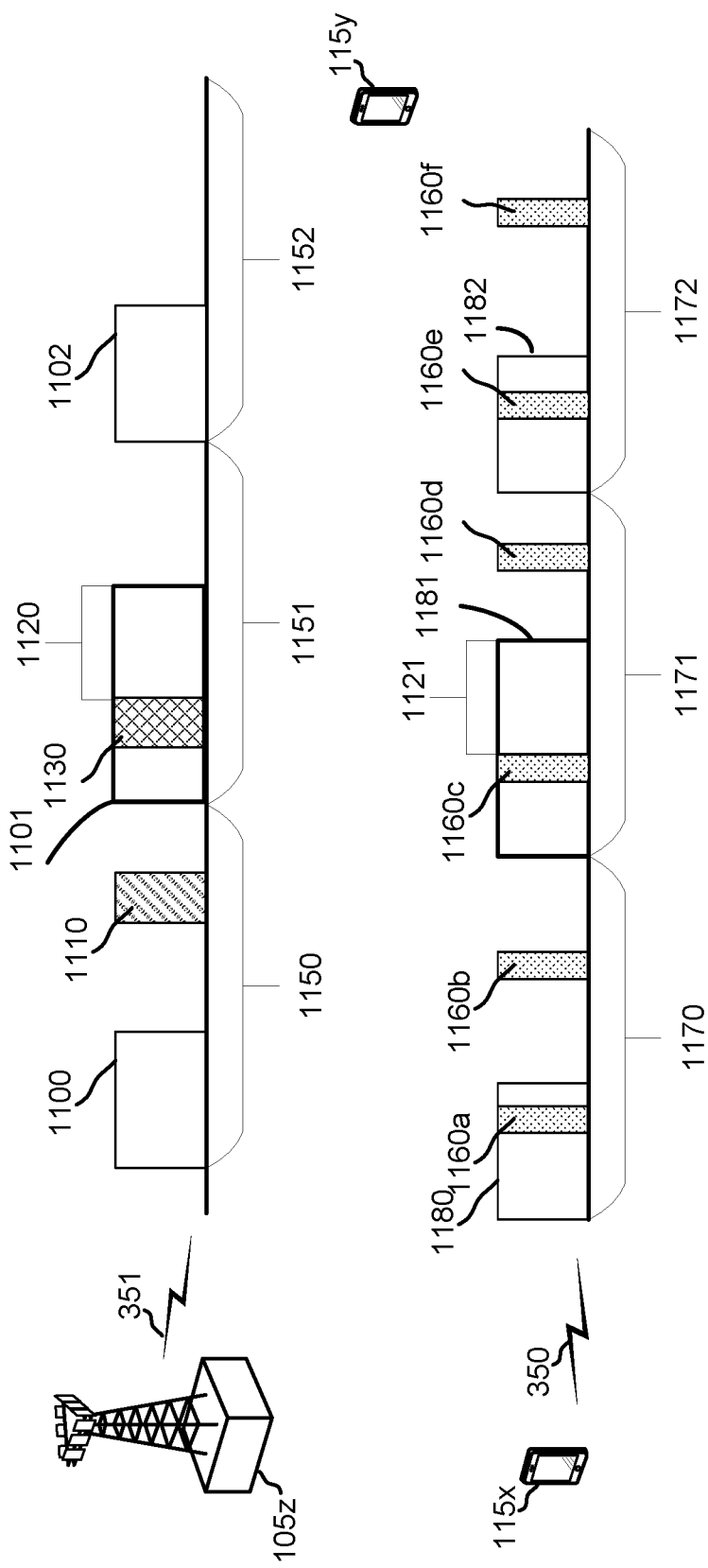
FIG. 11 is a diagram illustrating DRX in SL mode 2 operations implemented in accordance with some aspects of the present disclosure.

FIG. 11 is a diagram illustrating an example implementation of a DRX with SL in mode 2 process to implement one aspect of the present disclosure. As shown in FIG. 11, base station 105z may be in DRX communications with UE 115y over link 351. As described above, the DRX communication between base station 105z and UE 115y may be configured with a Uu DRX configuration, as also described above. Concurrently, UE 115y may also be in DRX communications with UE 115x over SL 350. In this case, the DRX communication between UE 115x and UE 115y may be configured with an SL DRX configuration. As can be seen, UE 115y may be configured with two DRX configurations (e.g., a Uu DRX configuration and an SL DRX configuration) using different DRX timers. In this sense, as mentioned above, UE 115y may be configured to implement DRX communications concurrently with a base station and an SL UE, enabling UE 115y to leverage the benefits of DRX communication (e.g., power savings) while implementing an SL communications scheme.

As illustrated in FIG. 11, the Uu DRX configuration for the DRX communication between UE 115y and base station 105z may include one or more Uu DRX cycles (e.g., 1150-1152). The Uu DRX cycles of UE 115y may include active periods and inactive periods. For example, Uu DRX cycles 1150-1152 may include active periods 1100-1102, respectively. In these aspects, UE 115y may monitor for control information from base station 105z during active periods 1100-1102. In these aspects, UE 115y may monitor for DCI during active periods, but may not monitor for DCI outside of active periods (e.g., during inactive periods). When a DCI transmission (e.g., in a PDCCH) is detected or received by UE 115y during an active period, the active period during which the DCI is received may be extended. In that sense, the active period of a Uu DRX cycle of UE 115y may be a function of events in the link between base station 105z and UE 115y.

As further illustrated in FIG. 11, the SL DRX configuration for the SL DRX communication between UE 115y and UE 115x may include one or more SL DRX cycles (e.g., 1170-1172). The SL DRX cycles of UE 115y may include active periods and inactive periods. For example, SL DRX cycles 1170-1172 may include active periods 1180-1182, respectively. In these aspects, UE 115y may monitor for control information from UE 115x during active periods 1180-1182. In these aspects, UE 115y may monitor for SCI transmissions from UE 115x over SL 350 during active periods, but may not monitor for SCI transmissions outside of active periods (e.g., during inactive periods). When an SCI transmission (e.g., in a PSCCH) is detected or received by UE 115y during an active period, the active period during which the SCI is received may be extended. In that sense, the active period of an SL DRX cycle of UE 115y may be a function of events in the SL between UE 115y and UE 115x.

In aspects, extending the active period of a Uu DRX cycle and/or an SL DRX cycle may include starting and/or restarting an inactivity timer associated with the respective DRX cycle in which the control information (DCI or SCI) is received. For example, as shown in FIG. 11, in response to UE 115y receiving a DCI transmission over PDCCH 1130 during active period 1101 of Uu DRX cycle 1151, active period 1101 may be extended by extension period 1120 after the end of the PDCCH reception. In this example, in response to UE 115y receiving an SCI transmission over a PSCCH in SL resource 1160c during active period 1181 of SL DRX cycle 1171, active period 1181 may be extended by extension period 1121 after the end of the PSCCH reception.

In some embodiments, a WUS may be sent from base station 105z to UE 115y prior to the transmission of PDCCH 1130 to ensure that UE 115y is monitoring for PDCCH 1130 during active period 1101. As described above, in response to receiving the PDCCH transmission (e.g., the DCI transmission over PDCCH 1130), UE 115y may extend active period 1101 by extension period 1120 when the DCI in PDCCH 1130 indicates that a subsequent data transmission is to be transmitted to UE 115y from base station 105z. In embodiments, the subsequent data transmission may be received by UE 115y during the extended active period.

In embodiments, UE 115y may be configured to provide the SL DRX configuration, including resources and timers, to other UEs, such as UE 115x. Providing the SL DRX configuration to other UEs may include transmitting a message (e.g., an SCI message over an SL link) from the DRX UE to other UEs.

As also shown in FIG. 11, SL resources 1160a-f may occur during DRX cycles 1170-1172. As described above, SL transmissions between UE 115x and 115y may be confined or restricted to these SL resources 1160a-f. As such, UE 115x may transmit using any of SL resources 1160a-f. For example, UE 115x may desire to transmit data to UE 115y over SL 350. In this case, UE 115x may schedule an SCI transmission to UE 115y over the SL in one of SL resources 1160a-f.

In embodiments, UE 115y may monitor for SCI transmissions from UE 115x during active periods 1180-1182. In some embodiments, UE 115y may monitor for SCI transmissions only during the duration of an SL resource that overlaps an active period. For example, active period 1180 overlaps SL resource 1160a. In this case, UE 115y may only monitor for SCI transmissions during the duration of SL resource 1160a, and may not monitor for SCI transmissions during the portion of active period 1180 that does not overlap SL resource 1160a. In other embodiments, UE 115y may monitor during the entirety of active period 1180. In another example, UE 115y may not monitor, or may forgo monitoring for SCI transmissions during SL resource 1160b, because SL resource 1160b does not overlap an active period.

In the example illustrated in FIG. 11, UE 115x may transmit control information (e.g., SCI) to UE 115y over SL 350 in SL resource 1160c. In embodiments, the SCI may include an indication of which SL resources UE 115x is to use to transmit a subsequent data transmission (e.g., data transmission over the PSSCH), as well as other transmission parameters.

In implementations, after transmitting the SCI to UE 115y in SL resource 1160c during active period 1171 over SL 350, UE 115x may transmit the subsequent data transmission over the PSSCH using the resources specified in the SCI. In some cases, UE 115y may, after receiving the PSSCH transmission, provide feedback (e.g., over a PSFCH).

In embodiments, in response to receiving the SCI transmission in the PSCCH in SL resource 1160c during active period 1181, UE 115y may extend active period 1181 by extension period 1121 when the SCI in the PSCCH indicates that the subsequent data transmission is to be transmitted to UE 115y from UE 115x. In embodiments, active period 1181 may be extended by starting and/or restarting an inactivity timer associated with SL DRX cycle 1171.

FIG. 12 is a block diagram illustrating example blocks executed to implement one aspect of the present disclosure. The example blocks will also be described with respect to UE 115 as illustrated in FIG. 9.

It is noted that the description of the example blocks of FIG. 12 is from the perspective of the first UE, which may refer to a UE operating in DRX with SL in mode 2 (e.g., UE 115y described above). In this example, the first UE may be in SL communications with a second UE (e.g., UE 115x). In embodiments, a base station (e.g., base station 105z) may serve one or both of the first UE and the second UE.

At block 1200, a first UE in communication with a second UE over an SL sends an SL DRX configuration to the second UE. In order to implement the functionality for such operations, UE 115, under control of controller/processor 280, executes transmission logic 902, stored in memory 282. The functionality implemented through the execution environment of transmission logic 902 allows for UE 115 to perform SL DRX configuration transmission operations according to the various aspects herein. In embodiments, the SL DRX configuration may specify an SL DRX mode of the first UE with respect to the SL. The SL DRX mode of the first UE may include at least one SL DRX cycle with an active period for reception over the SL and an inactive period of reception over the SL. During the active period, the first UE may monitor for transmissions (e.g., SCI transmissions) from the second UE. During the inactive period, the first UE may not monitor for transmissions (e.g., SCI transmissions) from the second UE.

In embodiments, a configuration of the SL between the first UE and the second UE may include at least one SL resource. In these embodiments, transmissions between the first UE and the second UE over the SL may be restricted to the at least one SL resource. In embodiments, the communication between the first UE and the second UE over the SL is performed without requesting a transmission grant from a base station.

In embodiments, the first UE may be further configured for Uu DRX mode with respect to communications with a base station. In embodiments, the Uu DRX mode of the first UE may include at least one Uu DRX cycle with an active period for reception over a link between the first UE and the base station and an inactive period of reception over the link. During the active period, the first UE may monitor for transmissions (e.g., DCI transmissions) from the base station. During the inactive period, the first UE may not monitor for transmissions (e.g., DCI transmissions) from the base station.

At block 1201, the first UE receives SCI in a PSCCH from the second UE over the SL. For example, the first UE (e.g., UE 115) engaged in communications over an SL with the second UE may receive SCI via antennas 252a-r and wireless radios 901a-r. In embodiments, the SCI in the PSCCH may be received by the first UE during the active period of the SL DRX cycle of the first UE. In embodiments, receiving the SCI in the PSCCH from the second UE may include monitoring, by the first UE, SL resources associated with the first UE for transmission of the SCI from the second UE. In embodiments, the monitored SL resources may overlap with the active period of the SL DRX cycle of the first UE.

At block 1202, the first UE extends, in response to receiving the SCI in the PSCCH from the second UE, the active period of the at least one SL DRX cycle in which the SCI in the PSCCH is received from the second UE when the SCI in the PSCCH indicates a subsequent data transmission over the SL from the second UE to the first UE. In order to implement the functionality for such operations, UE 115, under control of controller/processor 280, executes SL extension logic 902, stored in memory 282. The functionality implemented through the execution environment of SL extension logic 902 allows for UE 115 to perform active period extension operations according to the various aspects herein.

In embodiments, extending the active period of the SL DRX cycle includes one of: starting an inactivity timer associated with the SL DRX cycle upon an end of the reception of the SCI in the PSCCH from the second UE, and restarting the inactivity timer associated with the SL DRX cycle upon the end of the reception of the SCI in the PSCCH from the second UE.

FIG. 13 is a block diagram illustrating example blocks executed to implement one aspect of the present disclosure. The example blocks will also be described with respect to UE 115 as illustrated in FIG. 9. It is noted that the description of the example blocks of FIG. 13 is from the perspective of the first UE, which in this discussion may refer to a UE (e.g., UE 115x described above) in communication with a second UE that is operating in DRX with SL in mode 2 (e.g., UE 115y described above). In embodiments, a base station (e.g., base station 105z) may serve one or both of the first UE and the second UE.

At block 1300, a first UE in communication with a second UE over an SL receives an SL DRX configuration from the second UE. For example, the first UE (e.g., UE 115) engaged in communications over an SL with the second UE may receive SL DRX configuration via antennas 252a-r and wireless radios 901a-r. In embodiments, the SL DRX configuration may specify an SL DRX mode of the second UE with respect to the SL. The SL DRX mode of the second UE may include at least one SL DRX cycle with an active period for reception over the SL and an inactive period of reception over the SL. During the active period, the second UE may monitor for transmissions (e.g., SCI transmissions) from the second UE. During the inactive period, the second UE may not monitor for transmissions (e.g., SCI transmissions) from the second UE.

In embodiments, a configuration of the SL between the first UE and the second UE may include at least one SL resource. In these embodiments, transmissions between the first UE and the second UE over the SL may be restricted to the at least one SL resource. In embodiments, the communication between the first UE and the second UE over the SL is performed without requesting a transmission grant from a base station.

In embodiments, the second UE may be further configured for Uu DRX mode with respect to communications with a base station. In embodiments, the Uu DRX mode of the second UE may include at least one Uu DRX cycle with an active period for reception over a link between the second UE and the base station and an inactive period of reception over the link. During the active period, the second UE may monitor for transmissions (e.g., DCI transmissions) from the base station. During the inactive period, the second UE may not monitor for transmissions (e.g., DCI transmissions) from the base station.

At block 1301, the first UE transmits SCI in a PSCCH to the second UE. In embodiments, the SCI in the PSCCH may be received by the second UE during the active period of the at least one SL DRX cycle of the second UE. In order to implement the functionality for such operations, UE 115, under control of controller/processor 280, executes transmission logic 902, stored in memory 282. The functionality implemented through the execution environment of transmission logic 902 allows for UE 115 to perform SCI transmission operations according to the various aspects herein.

In embodiments, transmitting the SCI in the PSCCH to the second UE includes transmitting the SCI in the PSCCH in an SL resource of the at least one SL resource of the SL between the first UE and the second UE that overlap with an active period of the at least one SL DRX cycle of the second UE. In some embodiments, SL resource is monitored, by the second UE, for transmission of the SCI from the first UE.

At block 1302, the first UE causes the second UE to extend, in response to receiving the SCI in the PSCCH from the first UE, the active period of the at least one SL DRX cycle in which the SCI in the PSCCH is received from the first UE when the SCI in the PSCCH indicates a subsequent data transmission over the SL from the first UE to the second UE.

In embodiments, causing the second UE to extend the active period of the SL DRX cycle includes one of: causing the second UE to start an inactivity timer associated with the SL DRX cycle upon an end of the reception of the SCI in the PSCCH from the first UE, and causing the second UE to restart the inactivity timer associated with the SL DRX cycle upon the end of the reception of the SCI in the PSCCH from the first UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6-8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers.

Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a first user equipment (UE) in communication with a base station and in communication with a second UE over a sidelink, a wakeup signal (WUS) from the base station, wherein the first UE is operating in discontinuous reception (DRX) mode, and wherein the WUS is received by the first UE during an inactive period of a DRX cycle of the first UE;
   receiving, by the first UE in association with receiving the WUS from the base station, sidelink control information in a physical sidelink control channel (PSCCH) from the second UE, wherein the PSCCH is received by the first UE during an active period of a DRX cycle of the first UE; and
   extending, in response to receiving the sidelink control information in the PSCCH from the second UE, the active period of the DRX cycle in which the sidelink control information in the PSCCH is received from the second UE when the PSCCH indicates a subsequent data transmission over the sidelink from the second UE to the first UE.

2. The method of claim 1, wherein extending the active period of the DRX cycle includes one of:
   starting an inactivity timer associated with the DRX cycle upon an end of reception of the sidelink control information in the PSCCH from the second UE; and
   restarting the inactivity timer associated with the DRX cycle upon the end of the reception of the sidelink control information in the PSCCH from the second UE.

3. The method of claim 1, wherein the sidelink control information in the PSCCH is transmitted by the second UE to the first UE in response to the second UE receiving a transmission grant from a base station, the transmission grant including configuration for the subsequent data transmission over the sidelink.

4. The method of claim 3, wherein the transmission grant sent from the base station to the second UE includes an indication that the subsequent data transmission over the sidelink is intended for the first UE.

5. The method of claim 1, further comprising:
   activating the first UE for reception during the active period of the DRX cycle in response to receiving the WUS from the base station.

6. The method of claim 5, further comprising:
   monitoring, by the first UE, in response to receiving the WUS from the base station, the sidelink between the first UE and the second UE for transmission of the sidelink control information from the second UE.

7. The method of claim 1, wherein the WUS is transmitted from the base station in response to the base station granting a transmission grant to the second UE, the transmission grant including configuration for the subsequent data transmission received by the first UE over the sidelink.

8. The method of claim 1, further comprising:
   receiving, by the first UE, downlink control information (DCI) from the base station during the extended active period of the DRX cycle, the DCI received by the first UE subsequent to receiving the sidelink control information in the PSCCH from the second UE.

9. The method of claim 1, further comprising:
   transmitting, to the second UE, sidelink (SL) DRX configuration specifying an SL DRX mode of the first UE with respect to the sidelink, wherein the SL DRX mode of the first UE includes at least one SL DRX cycle with an active period for reception over the sidelink and an inactive period of reception over the sidelink.

10. The method of claim 8, wherein the first UE is further configured for Universal Terrestrial Radio Access Network (UTRAN) and UE (Uu) DRX mode with respect to communications with the base station, wherein the Uu DRX mode of the first UE includes at least one Uu DRX cycle with an active period for reception over a link between the first UE and the base station and an inactive period of reception over the link.

11. An apparatus for wireless communication, comprising:
    a processing system that includes one or more processors and one or more memories coupled to the one or more processors, the processing system being configured to cause the apparatus to:
    send, by a first user equipment (UE) in communication with a base station and in communication with a second UE over a sidelink, a request to the base station for a transmission grant for transmission over the sidelink, wherein sending the request for the transmission grant to the base station causes the base station to send a wakeup signal (WUS) to the second UE prior to the first UE transmitting sidelink control information (SCI) in a physical sidelink control channel (PSCCH) to the second UE;
    receive, by the first UE, the transmission grant from the base station serving the first UE and the second UE; and
    transmit, by the first UE in response to receiving the transmission grant from the base station, SCI in the PSCCH to the second UE, wherein the second UE is operating in discontinuous reception (DRX) mode, wherein the SCI in the PSCCH is received by the second UE during an active period of a DRX cycle of the second UE, the SCI including configuration for a subsequent data transmission from the first UE to the second UE over the sidelink, wherein transmitting the SCI in the PSCCH to the second UE causes the second UE to extend the active period of the DRX cycle of the second UE in which the SCI in the PSCCH is received when the PSCCH indicates the subsequent data transmission over the sidelink from the first UE to the second UE.

12. The apparatus of claim 11, wherein causing the second UE to extend the active period of the DRX cycle includes one of:
   causing the second UE to start an inactivity timer associated with the DRX cycle upon an end of reception of the sidelink control information in the PSCCH from the first UE; and
   causing the second UE to restart the inactivity timer associated with the DRX cycle upon the end of the reception of the sidelink control information in the PSCCH from the first UE.

13. The apparatus of claim 11, wherein the transmission grant received by the first UE includes an indication that the subsequent data transmission is intended for the second UE.

14. The apparatus of claim 11, wherein the request for the transmission grant includes an indication that the subsequent data transmission is intended for the second UE.

15. The apparatus of claim 11, wherein the WUS is sent to the second UE upon granting of the transmission grant by the base station.

16. The apparatus of claim 11, wherein the WUS is configured to activate the second UE for reception during the active period of the DRX cycle in response to receiving the WUS from the base station.

17. The apparatus of claim 16, wherein causing the base station to send the WUS to the second UE causes the second UE to, in response to receiving the WUS from the base station, monitor the sidelink between the first UE and the second UE for transmission of the SCI from the first UE.

18. A method of wireless communication, comprising:
   sending, by a first user equipment (UE) in communication with a base station and in communication with a second UE over a sidelink (SL), a request to the base station for a transmission grant for transmission over the sidelink, wherein sending the request for the transmission grant to the base station causes the base station to send a wakeup signal (WUS) to the second UE prior to the first UE transmitting SL control information (SCI) in a physical SL control channel (PSCCH) to the second UE;
   receiving, by the first UE, the transmission grant from the base station serving the first UE and the second UE;
   transmitting, by the first UE in response to receiving the transmission grant from the base station, the SCI in the PSCCH to the second UE, wherein the SCI in the PSCCH is received by the second UE during an active period of at least one SL discontinuous reception (DRX) cycle of the second UE, wherein transmitting the SCI in the PSCCH to the second UE causes the second UE to:
      extend, in response to receiving the SCI in the PSCCH from the first UE, the active period of the at least one SL DRX cycle in which the SCI in the PSCCH is received from the first UE when the SCI in the PSCCH indicates a subsequent data transmission over the SL from the first UE to the second UE.

19. The method of claim 18, further comprising:
   sending SL DRX configuration to the second UE specifying an SL DRX mode of the second UE with respect to the SL, wherein the SL DRX mode of the second UE includes the at least one SL DRX cycle with an active period for reception over the SL and an inactive period of reception over the SL.

20. The method of claim 18, wherein the first UE is further configured for Universal Terrestrial Radio Access Network (UTRAN) and UE (Uu) DRX mode with respect to communications with a base station, wherein the Uu DRX mode of the first UE includes at least one Uu DRX cycle with an active period for reception over a link between the first UE and the base station and an inactive period of reception over the link.

21. An apparatus for wireless communication, comprising:
   a processing system that includes one or more processors and one or more memories coupled to the one or more processors, the processing system being configured to cause the apparatus to:
      transmit, by a base station serving a first user equipment (UE) and a second UE, a transmission grant to the first UE, the first UE in communication with the second UE over a sidelink, the second UE operating in discontinuous reception (DRX) mode; and
      transmit, by the base station, in response to transmitting the transmission grant to the first UE, a wakeup signal (WUS) to the second UE, the WUS transmitted to the second UE prior to the first UE transmitting sidelink control information (SCI) in a physical sidelink control channel (PSCCH) to the second UE,
   wherein the transmission grant causes the first UE to send the SCI in the PSCCH to the second UE, the SCI including configuration for a subsequent data transmission from the first UE to the second UE over the sidelink,
   wherein the SCI in the PSCCH is received, by the second UE in association with receiving the WUS from the base station, during an active period of a DRX cycle of the second UE, and
   wherein receiving the SCI in the PSCCH from the first UE causes the second UE to extend the active period of the DRX cycle of the second UE in which the SCI in the PSCCH is received when the PSCCH indicates the subsequent data transmission over the sidelink from the first UE to the second UE.

22. The apparatus of claim 21, wherein causing the second UE to extend the active period of the DRX cycle includes one of:
   causing the second UE to start an inactivity timer associated with the DRX cycle upon an end of reception of the SCI in the PSCCH from the first UE; and
   causing the second UE to restart the inactivity timer associated with the DRX cycle upon the end of the reception of the SCI in the PSCCH from the first UE.

23. The apparatus of claim 21, wherein the transmission grant includes an indication that the subsequent data transmission over the sidelink is intended for the second UE.

24. The apparatus of claim 21, wherein the processing system is further configured to cause the apparatus to:
   receive, by the base station, a request for the transmission grant from the first UE, wherein the request for the transmission grant includes an indication that the subsequent data transmission is intended for the second UE.

25. The apparatus of claim 21, wherein the processing system is further configured to cause the apparatus to:
   determine, by the base station, that the subsequent data transmission is intended for the second UE based on a buffer status report (BSR).

26. The apparatus of claim 22, wherein the WUS is configured to activate the second UE for reception during the active period of the DRX cycle in response to receiving the WUS from the base station.

27. The apparatus of claim 22, wherein transmitting the WUS to the second UE causes the second UE to, in response to receiving the WUS from the base station, monitor the sidelink between the first UE and the second UE for transmission of the SCI from the first UE.

28. The apparatus of claim 21, wherein the processing system is further configured to cause the apparatus to:
 transmit, by the base station, downlink control information (DCI) to the second UE during the extended active period of the DRX cycle, the DCI transmitted to the second UE subsequent to the second UE receiving the SCI in the PSCCH from the first UE.

* * * * *